United States Patent
Thomason et al.

(10) Patent No.: US 6,975,439 B2
(45) Date of Patent: Dec. 13, 2005

(54) IMAGE DISPLAY

(75) Inventors: Graham G. Thomason, Redhill (GB); Cornelis Van Berkel, Hove (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 90 days.

(21) Appl. No.: 10/241,133

(22) Filed: Sep. 11, 2002

(65) Prior Publication Data
US 2003/0063341 A1 Apr. 3, 2003

(30) Foreign Application Priority Data
Sep. 28, 2001 (GB) .................... 0123352

(51) Int. Cl.⁷ ............................... G02B 5/32
(52) U.S. Cl. .............. 359/15; 359/619; 362/558; 362/560; 362/561; 345/84
(58) Field of Search .................. 359/15, 1, 619, 359/620; 362/553, 558–561; 345/87, 84

(56) References Cited

U.S. PATENT DOCUMENTS

| | | | |
|---|---|---|---|
| 5,305,124 A | 4/1994 | Chern et al. | |
| 5,692,820 A | 12/1997 | Gale et al. | |
| 6,061,489 A * | 5/2000 | Ezra et al. | 385/115 |
| 6,064,424 A | 5/2000 | van Berkel et al. | |
| 6,118,584 A | 9/2000 | Van Berkel et al. | |
| 6,233,024 B1 * | 5/2001 | Hiller et al. | 348/744 |

* cited by examiner

Primary Examiner—Fayez G. Assaf

(57) ABSTRACT

Apparatus for displaying an image comprises a liquid crystal display 12, a lenticular lens array 14 for directing different portions of the image in different directions and mirrors 16 for reflecting at least some of the directed image, to produce an effective image 18 larger than the original image. The apparatus can be a mobile phone 10 or a visual display unit.

10 Claims, 4 Drawing Sheets

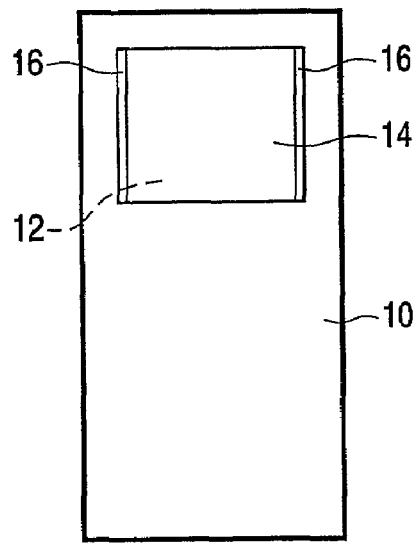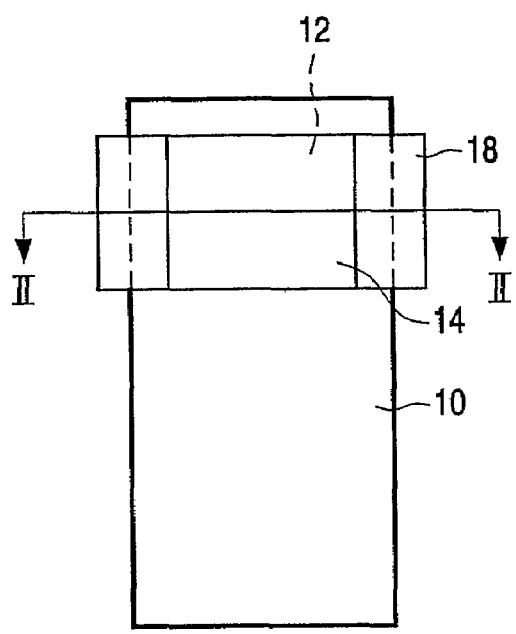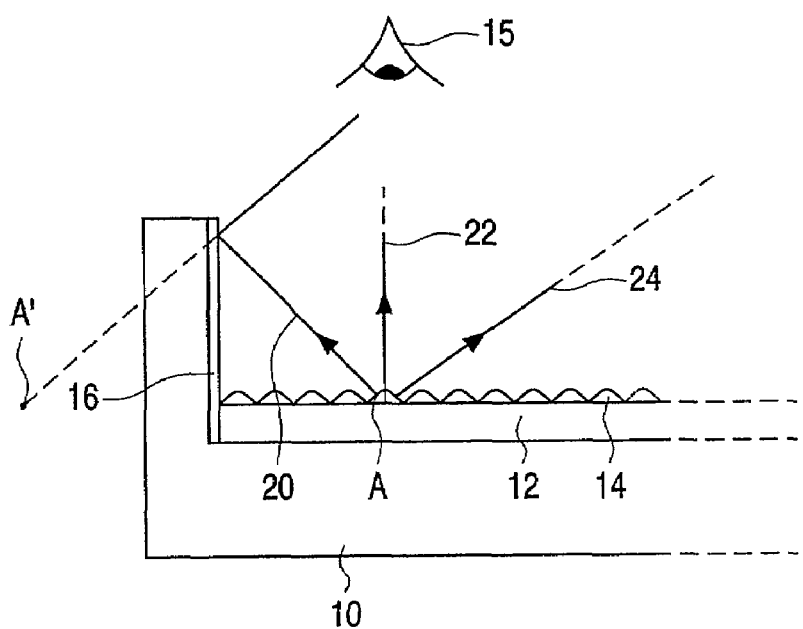

Figure 2A:
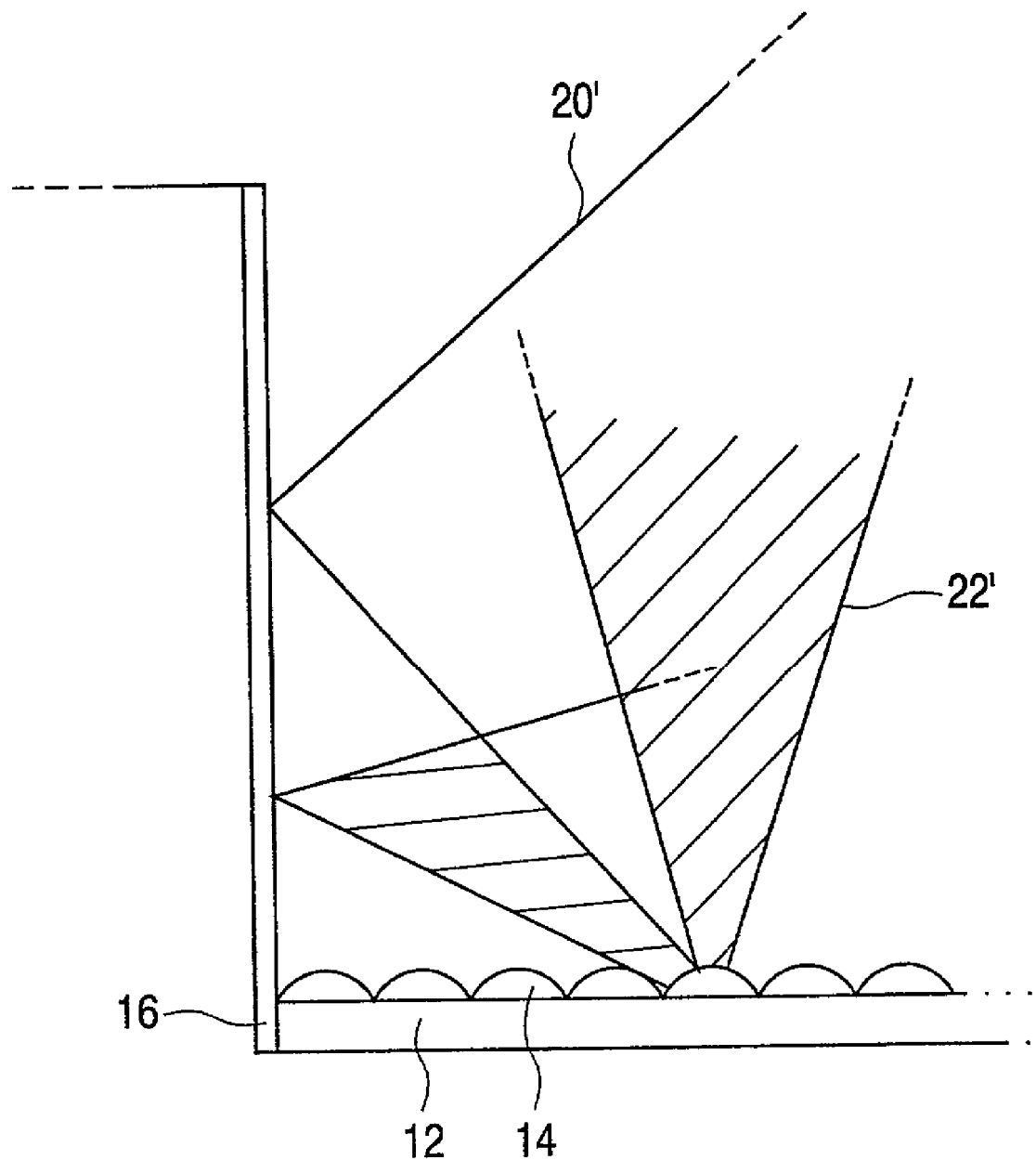

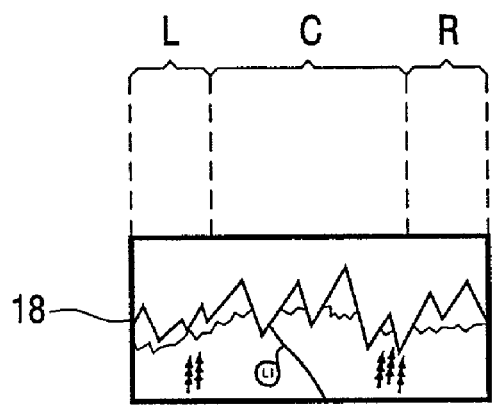
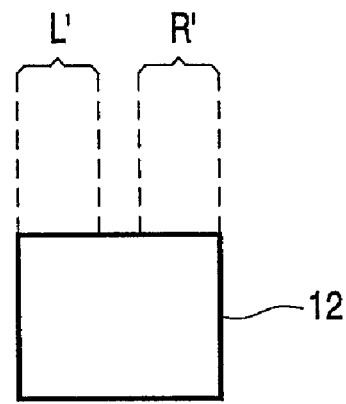
Fig.3a    Fig.3b
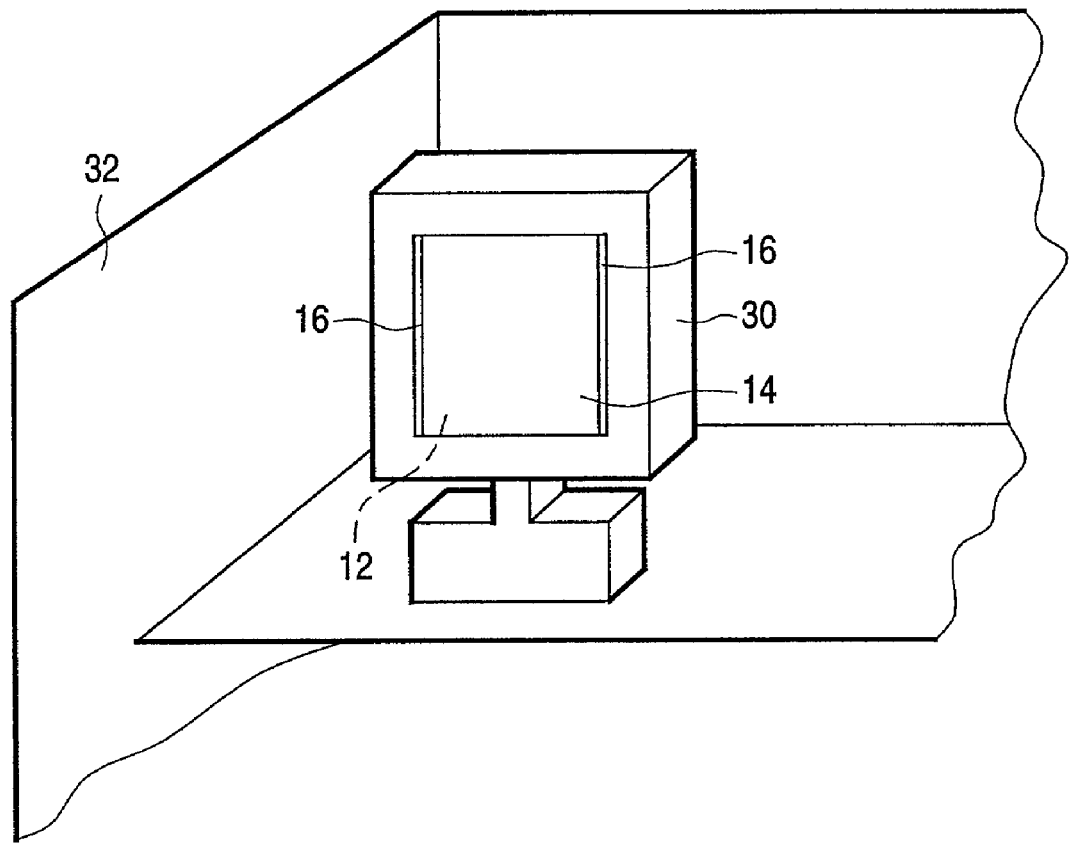
Fig.4

IMAGE DISPLAY

This invention relates to an apparatus and a method for displaying an image. In particular it relates to an apparatus and method for producing an effective image that is larger than the generated image.

Portable communication devices, for example, mobile phones are increasingly popular. However, while on the one hand there is a desire to miniaturise the device to increase its portability, there is a competing desire to increase the functionality of the device by including such features as video telephony and internet browsing capabilities. For a user to derive the greatest benefit from these additional features, a suitably large display is required, which conflicts with the desire to miniaturise the device. A different but related problem also occurs in small office spaces where it is often desirable to have a much larger display screen area than is possible owing to the physical constraints of the desk and cubicle.

U.S. Pat. No. 5,305,124 discloses a virtual image display system for displaying a relatively large virtual image to a user derived from a relatively small image source. A lens group is provided for amplifying an image provided by the image source. A plurality of reflecting elements are provided for magnifying the image provided by the lens group and for displaying the relatively large virtual image. The image provided by the image source is amplified through a lens group comprising at least two optical lenses and is then magnified by first and second reflecting mirrors to project a large screen image to a user. The system may also include a window element, typically configured in elliptical shape, to minimise ambient reflection observed by the user. The system of this Patent is a projection system and does not provide a solution for direct viewing of, for example, a mobile communication device.

It is therefore an object of the invention to provide an improved display apparatus and method.

According to a first aspect of the present invention, there is provided apparatus for displaying an image comprising image generating means, image directing means for directing a first portion of the image in a first direction and for directing a second portion of the image in a second direction, and image reflecting means for reflecting at least some of said second portion, operable to produce an effective image larger than said image generating means.

According to a second aspect of the present invention, there is provided a method for displaying an image comprising generating an image, directing a first portion of the image in a first direction, directing a second portion of the image in a second direction, and reflecting at least some of the second portion, thereby producing an effective image larger than the generated image.

Owing to the invention, it is possible to provide an effective image that is larger than the generated image, but without requiring any projection onto a screen, so that the user can view the effective image directly from the device. A display of a given physical area can be used to present a significantly larger effective image to the user.

To view the whole of the effective image, the user may need to move their head relative to the image generating means so that they are looking towards the image reflecting means. This depends upon the position of the user's eye relative to the apparatus. When the user's eye is close to the apparatus the whole of the effective image can be seen directly. In this way a user can view all of the different parts of the effective image. The whole of the image can be considered to be mentally present.

Advantageously the image generating means comprises a liquid crystal display or an array of light emitting diodes. The image directing means preferably comprises a lenticular lens array or an array of substantially spherical lenses overlying said image generating means. Alternatively said image generating means and said image directing means may comprise an array of directional light sources.

The image reflecting means advantageously comprises first and second elements located at respective opposite sides of said image generating means, and desirably located at substantially all sides of said image generating means. In a preferred embodiment, the image reflecting means comprises a mirror.

Figure 5:
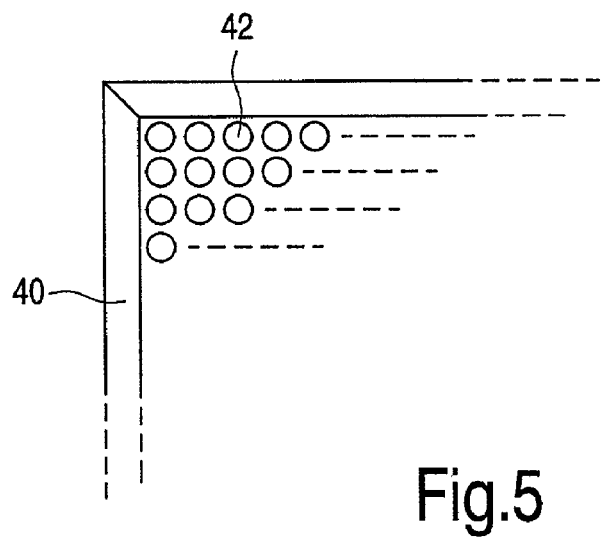
Figure 6:
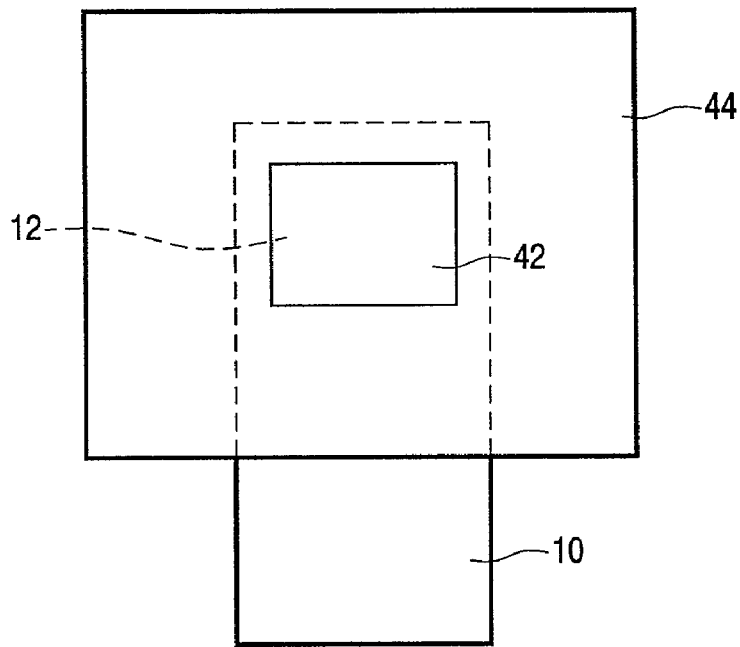
Figure 7:
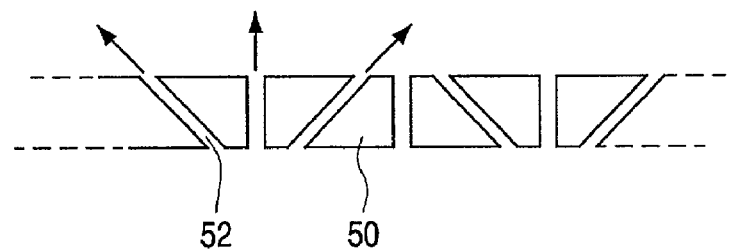

Embodiments of the invention will now be described, by way of example only, with reference to the accompanying drawings, in which:

FIG. 1a is a front view of a mobile communication device,

FIG. 1b is a front view of the mobile communication device of FIG. 1a showing a mental perception of an effective image, FIG. 2 is a partial section along the line II—II of FIG. 1b, FIG. 2a is a more detailed view of FIG. 2, FIG. 3a is a view of an effective image, FIG. 3b is a view of image generating means of the mobile communication device, FIG. 4 is a perspective view of a visual display unit, FIG. 5 is a partial front view of a second embodiment of the image directing means, FIG. 6 is a front view of a second embodiment of the mobile communication device showing a mental perception of an effective image, and FIG. 7 is a partial section of another embodiment of the image generating means and image directing means.

In FIGS. 1a, 1b and 2, a mobile communication device in the form of a mobile phone 10 is shown. The phone 10 includes image generating means in the form of a liquid crystal display 12 and image directing means in the form of a lenticular lens array 14 overlying the image generating means. The phone 10 also includes image reflecting means. The image reflecting means comprises first and second elements in the form of mirrors 16, located at respective opposite sides of the image generating means. The image reflecting means can be a curved, multi-facet or sawtooth mirror, or any reflective surface.

The phone 10 also includes conventional components and features including an aerial, keypad, microphone, speaker etc., not shown for reasons of clarity. FIG. 1b shows the phone 10 when the power is on and the phone 10 is producing an effective image 18 larger then the original image.

FIG. 2 shows, in more detail, the working of the apparatus for displaying an image. FIG. 2 is not to scale, in order to facilitate understanding of the apparatus. For example, the lenticular lens array 14 is shown much larger than it is in reality. The lens array 14 comprises a large number of small lenses that extend from top to bottom of the array and are semi-cylindrical in cross-section. Such lenses are well known in the field of autostereoscopic displays, described in, for example, U.S. Pat. No. 6,064,424 and U.S. Pat. No. 6,118,584, incorporated herein by reference.

The liquid crystal display 12, in this arrangement, has three pixels across the width of each lens of the array 14. The light emitted by each pixel travels in a straight path through the lens overlying it and is then directed on exit by the curvature of the lens surface. The subsequent paths of the light of each set of three pixels are shown for one set of three in FIG. 2. The paths shown represent the centre line of a conical fan of light that is produced by each lens/pixel combination of the array 14.

The conical fans are illustrated in FIG. 2a, for clarity purposes, showing only the fans 20' and 22'. The fan 22' is directed in a forwards direction, and the fan 20' is directed in a sideways direction to be reflected by the mirror 16.

The paths 20, 22 and 24 are followed by all of the pixels in that column of the display 12. The light from the columns of three pixels underneath each other lens is directed in the three different directions in the same respective manner. The net result of this is that the image produced by the image generating means is directed by the image directing means, with a first portion of the image travelling in a first direction, a second portion of the image travelling in a second direction and a third portion travelling in a third direction.

The light on the path 22 and all of the light emitted from the pixels being similarly directed in a forward direction combine to create the central part of the effective image 18. While only one third of the pixels in the display 12 are used to create this part of the effective image 18, as long as the display 12 is of sufficiently high resolution, a perfectly acceptable effective image 18 is produced.

The path 20 illustrates the path of the light emitted from the column of pixels that are directed by the lens to one side, at an angle to the horizontal. The value of the angle depends upon the exact position of the pixel relative to the lenticular lens and also on the shape of the lens curve. A portion of the totality of the light that is directed toward the one side is reflected by the mirror 16. In FIG. 2 this mirror 16 is shown as being at 90 deg to the display 12 and lens array 14, but the mirror could equally well be placed at an angle off the to perpendicular, sloping outwards. In some applications this may, in fact, be preferable.

The portion of the image from the display 12 that is reflected by the mirror 16 creates a portion of the effective image 18 to one side of the central part. This side portion of the effective image 18, in most positions of the user's eye 15, is visible to the user of the phone 10 when the phone 10 is tilted so that the user is looking more towards the mirror 16. The pixel A is seen by the user as if it is at the point A'. If the user's eye 15 is close to the phone 10 (as in FIG. 2), then both of the central and side parts of the effective image will be seen, without any need to tilt the phone.

At the opposite side of the display 12, a portion of the totality of the light that is directed toward the second side of the display 12 is reflected by the mirror 16 on that side of the display. This light that is reflected by the mirror 16 creates the other side of the effective image 18. In this manner the effective image 18 is built up from three discrete portions of the original image produced by the display 12.

The actual rays seen by the user's eye depends upon the position of the phone 10 relative to the user. Since each pixel produces a cone of light (as shown in FIG. 2a), as long as the user's eye is within the cone they will receive a ray of light from that pixel.

In order to produce the effective image 18, it is necessary to carry out a certain amount of image processing to ensure that the pixels in the display 12 are addressed correctly to produce the final effective image 18. This is illustrated in more detail in FIGS. 3a and 3b (shown to scale). The effective image 18 of FIG. 3a is to be shown by the phone 10 having a liquid crystal display 12 as in FIG. 3b. The central portion C of the effective image 18 is mapped to the central columns of each set of three columns of pixels across the entirety of the display 12, reducing its resolution by two thirds. The left hand portion L of the effective image 18 is mapped in reverse to the left hand columns of each of the set of three columns of pixels in the portion L' of the display 12 of FIG. 3b, again reducing its resolution by two thirds. The right hand portion R of the effective image 18 is mapped in reverse to the right hand columns of each of the set of three columns of pixels in the portion R' of the display 12 of FIG. 3b, also reducing its resolution by two thirds. This image processing produces the correct effective image 18, once the lenticular lens array 14 and mirrors 16 have directed and reflected the particular portions of the original image produced by the display 12.

FIG. 4 shows a visual display unit 30, with the lenticular lens array 14 overlying the liquid crystal display 12. The display unit 30 is provided with mirrors 16. When the unit 30 is in power on mode, an effective image is produced that is larger than the original image from the display 12, in the same manner as described for the phone 10 of FIGS. 1a, 1b and 2. The user of such a unit 30 therefore has an effective image larger than the screen of the unit 30 and can, even if working in a relatively confined space, derive the advantage of such an enlarged effective image. For example, at the left hand side of the unit 30 the effective image will extend over the partition screen 32 to create useful extra display space.

FIGS. 5 and 6 relate to a second embodiment of the display apparatus of the mobile phone 10. In this embodiment, the image reflecting means (in the form of a mirror 40) is located at substantially all sides of the image generating means (a liquid crystal display 12). The image directing means comprises an array of substantially spherical lenses 42 overlying the display 12. The lenses are convex and can potentially direct the light from the pixels below in any direction. The actual direction in which a lens directs the received light depends upon the position of each pixel below relative to the lens and on the shape of the lens curvature.

In this embodiment, each substantially spherical lens overlies a three by three matrix of pixels, with the central pixel of the nine pixels being directed in a forward direction. Four pixels, one in each of the centre of each side, are directed toward their respective nearest side of the display 12. The four corner pixels of the matrix of nine are directed in at an angle halfway in-between that of the paths travelled by the adjacent centre-side pixels. In this way an effective image 44 is provided that is larger than the original image from the display 12, but also covers an area that extends out from the original display 12 in all directions (in the plane of the display 12). Reflections through two mirrors are used to create viewing zones occupying the corners of the virtual viewing space.

An alternative arrangement to the array of substantially spherical lenses 42 shown in FIG. 5, is to have a lens arrangement that comprises an array of hexagonally packed lenses that are still nevertheless each substantially spherical.

FIG. 7 show a section through another embodiment of the image generating means and image directing means, where they comprise an array, of directional light sources 50 that replaces the display and lens arrays of the previous embodiments. The array 50 transmits light in a number of different directions from the channels 52 as shown by the arrows. In this way light can be generated to travel in a forward direction for the central part of the resulting virtual image and light can be suitably directed at the mirrors as desired in order to create the side portions of the effective image. A number of modifications of this embodiment are possible, including having channels 52 that are conical with a diverging mouth to provide a cone of light. The number of channels can be increased to provide light travelling in more than three different directions, to increase the size of the effective image, or to provide a 3D effective image.

Other known directional means for directing the light include a parallax barrier system, an array of holographic elements, a collimating system, a pinhole arrangement, interference filters, and prisms.

In another embodiment (not shown) the image directing means operates by time multiplexing a single pixel in different directions. Each pixel therefore provides the light necessary for each part of the effective image in turn and the image directing means has a duty cycle scheme that directs the emitted light at the different portions of the image reflecting means, in turn.

In yet a further embodiment the image directing means directs a portion of the light from the pixels at an angle of incidence that is much closer to the horizontal than that shown in FIG. 2. The result of this is that the light is reflected by the mirror 16 across to the second element of the mirror 16 on the opposite side of the display 12, and then reflected out for adding further to the effective image. This creates an even larger effective image, with the light that is reflected twice being visible beyond the edge of the light that is reflected once.

In another embodiment, the pitch of the lenticular lens array 14 is slightly larger than the pitch of two pixels, with the result that the lens array 14 is not directly aligned with the pixels underneath over the whole of the width of the display 12. In the centre of the display 12 the lenses are substantially aligned with the pixels underneath, but on either side of the centre each lens is offset to a degree, which increases progressively towards the edge of the display 12. In this embodiment only columns of two pixels are used to create the effective image 18 which will have side portions of the effective image 18 each equal to half of the size of the original image. The resolution of the effective image 18 is half that of the original image.

In a still further embodiment, the pitch of the lens array 14 is the same as the pitch of the pixels in the display 12, but the lens array 14 is not necessarily aligned exactly with the pixels underneath. In this case the software controlling the pixels adapts to the difference in alignment to correct the difference.

Further refinements of the apparatus are possible, including the use of standard ranging techniques to make the effective image appear to come from a greater distance than the physical screen. This is to facilitate peering into the display at close range. The directing of the light can be taken advantage of to produce a three-dimensional effective image, by including in each portion of the effective image at least two views, one for each eye. Where the effective image is produced on a visual display unit, the associated processor and software can be arranged so that a mouse or pointing device can be used to select a point or portion of the effective image that is outside the normal physically constrained display. The apparatus for producing the effective image can be used on a wide range of display devices, including PDAs, remote control devices, televisions, monitors, dashboard displays, head mounted displays etc. In the case where the apparatus is a dashboard display, the windscreen can act as the image reflecting means. A suitably placed display with a lenticular overlay can show one set of information when directly looked at, and another when a user looks at the display via the reflection in the windscreen.

What is claimed is:

1. Apparatus for displaying an image comprising image generating means, image directing means for directing a first portion of the image in a first direction and for directing a second portion of the image in a second direction, and image reflecting means for reflecting at least some of said second portion, operable to produce an effective image larger than said image generating means,
   wherein said image directing means comprises a lenticular lens array overlying said image generating means.

2. Apparatus for displaying an image comprising image generating means, image directing means for directing a first portion of the image in a first direction and for directing a second portion of the image in a second direction, and image reflecting means for reflecting at least some of said second portion, operable to produce an effective image larger than said image generating means,
   wherein said image directing means comprises an array of substantially spherical lenses overlying said image generating means.

3. Apparatus for displaying an image comprising an image generating means, image directing means for directing a first portion of the image in a first direction and for directing a second portion of the image in a second direction, and image reflecting means for reflecting at least same of said second portion, operable to produce an effective image larger than said image generating means,
   wherein said image generating means and said image directing means comprise an array of directional light sources directing light in at least the first and second directions.

4. Apparatus for displaying an image comprising image generating means, image directing means for directing a first portion of the image in a first direction and for directing a second portion of the image in a second direction, and image reflecting means for reflecting at least some of said second portion, operable to produce an effective image larger than said image generating means,
   wherein said image directing means comprises either a parallax barrier system or an array of holographic elements.

5. Apparatus for displaying an image comprising image generating means, image directing means for directing a first portion of the image in a first direction and for directing a second portion of the image in a second direction, and image reflecting means for reflecting at least some of said second portion, operable to produce an effective image larger than said image generating means,
   wherein said image directing means comprises first and second elements located at respective opposite sides of said image generating means.

6. Apparatus according to claim 5, wherein said image reflecting means is located at substantially all sides of said image generating means.

7. A method for displaying an image comprising generating an image, directing a first portion of the image in a first direction, directing a second portion of the image in a second direction, and reflecting at least some of said second portion to produce an effective image larger than said image generating image,
   wherein the effective image comprises a central portion and two side portions disposed on either side of the central portion, and wherein generating the image includes:
   providing image data for a central portion of the effective image to central columns of each group of three columns of pixels across a display;
   providing image data for a left hand portion of the effective image to left hand columns of each group of three columns of pixels across the display; and providing image data for a right hand portion of the effective image to right hand columns of each group of three columns of pixel across the display.

8. An apparatus for displaying an image, comprising:
a display device adapted to generate an image;
image directing means for receiving the image and for directing a first portion of the image in a first direction, and for directing a second portion of the image in a second direction forming an angle with respect to the first direction; and
a reflecting device adapted to receive the second portion of the image, an to reflect at least a part of said second portion in a third direction to form an effective image having a size larger than a size of the display device,
wherein the effective image comprises a central portion and two side portions disposed on either side of the central portion, and wherein the first portion of the image from the image directing means produces the central portion of the effective image, and part of the second portion of the image reflected by the reflecting device produces the two side portions of the effective image.

9. Apparatus for displaying an image comprising image generating means, image directing means for directing a first portion of the image in a first direction and for directing a second portion of the image in a second portion, and image reflecting means for reflecting at least some of said second portion, operable to produce an effective image larger than said image generating means,
wherein the image reflecting means does not reflect the first portion of the image.

10. A method for displaying an image comprising generating an image, directing a first portion of the image in a first direction, directing a second portion of the image in a second direction, and reflecting at least some of the second portion to produce an effective image larger than the generated image,
wherein directing the first portion of the image in the first direction does not include reflecting the first portion of the image.

* * * * *